March 24, 1925.

J. M. HARRISON

HEAT EXCHANGE APPARATUS

Filed April 24, 1919

1,530,559

5 Sheets-Sheet 1

INVENTOR:
James M. Harrison
BY
Frank L. Dresing
ATTORNEY

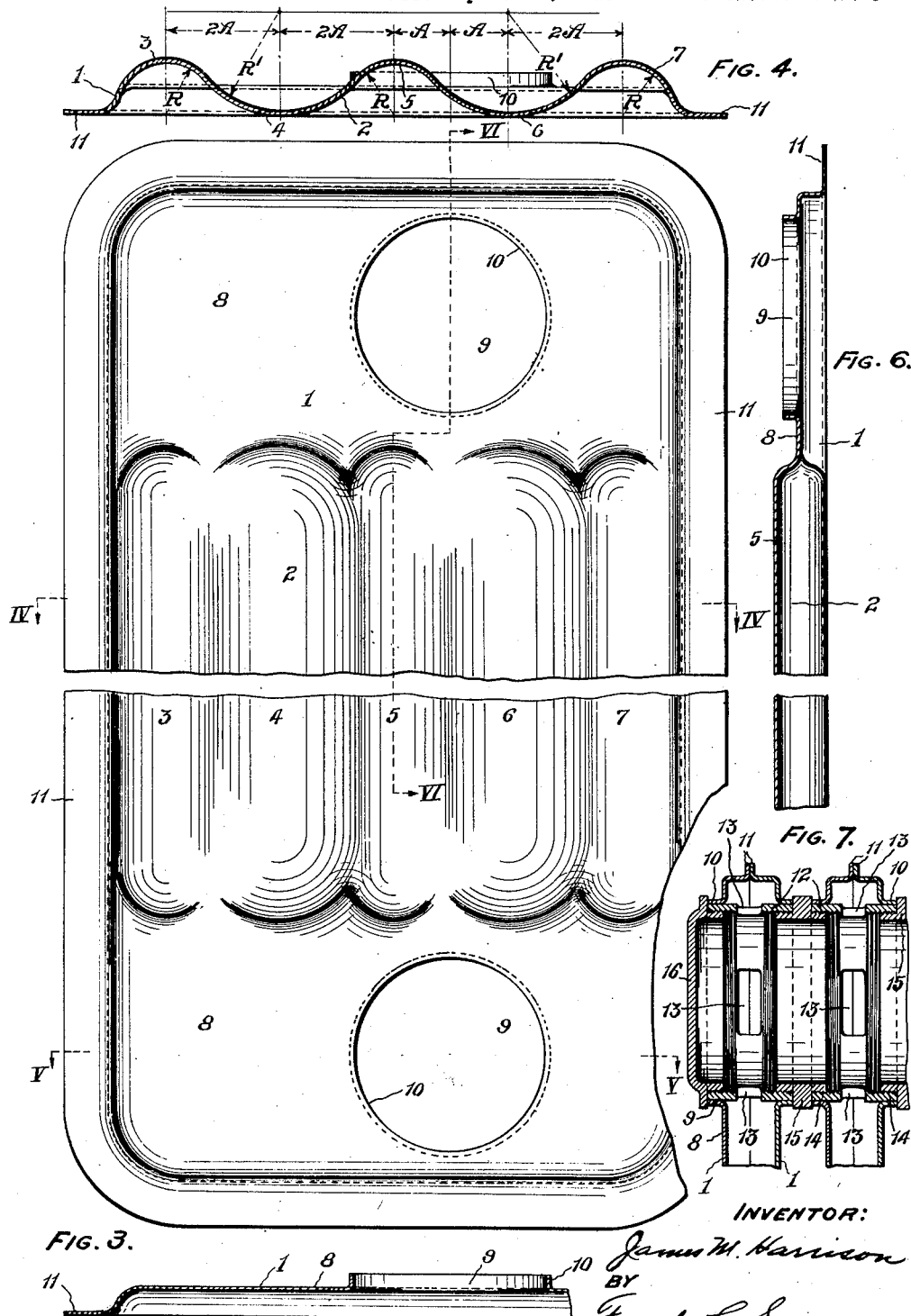

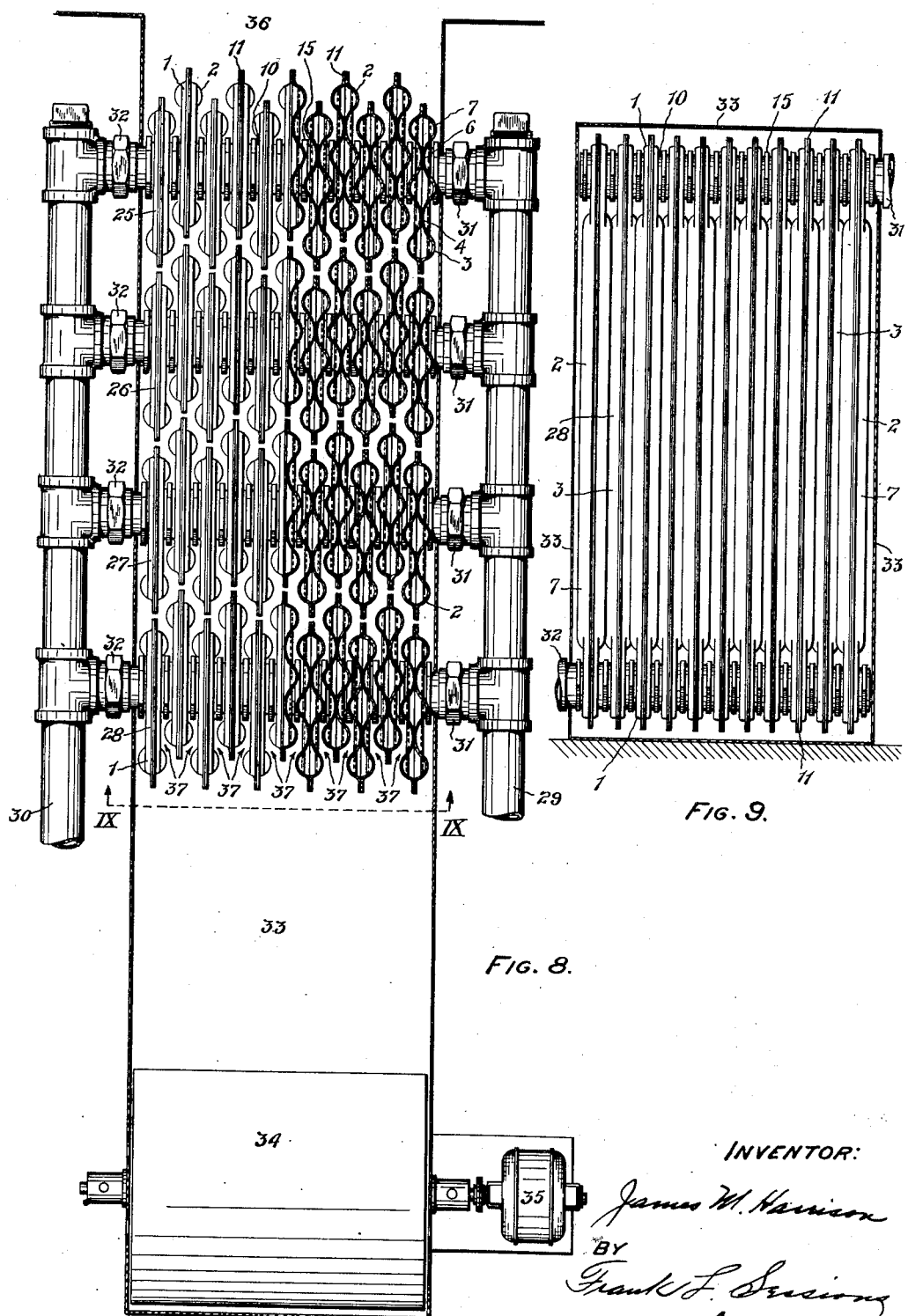

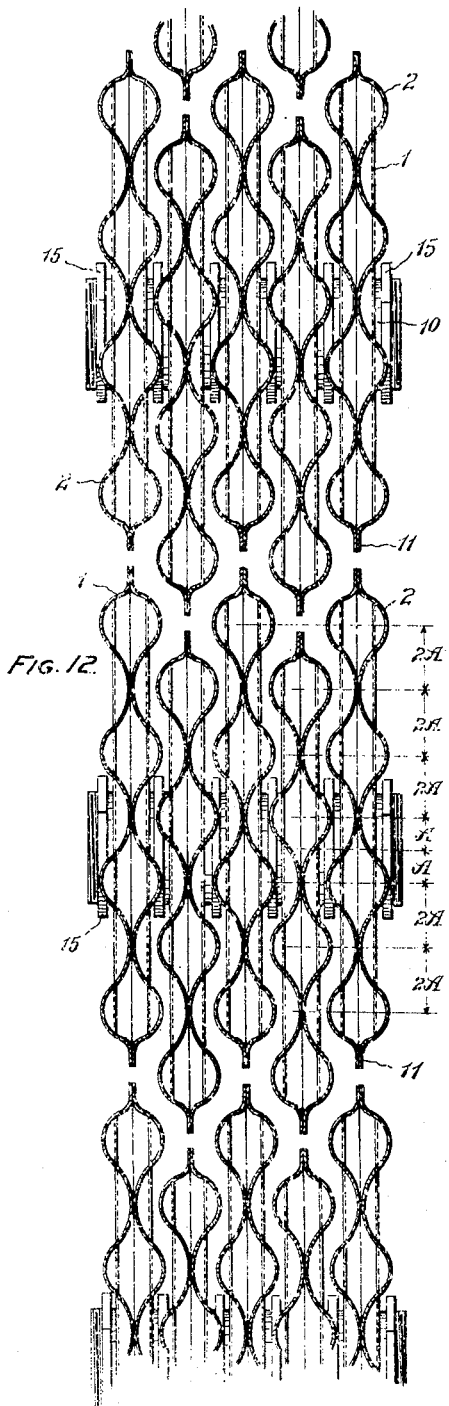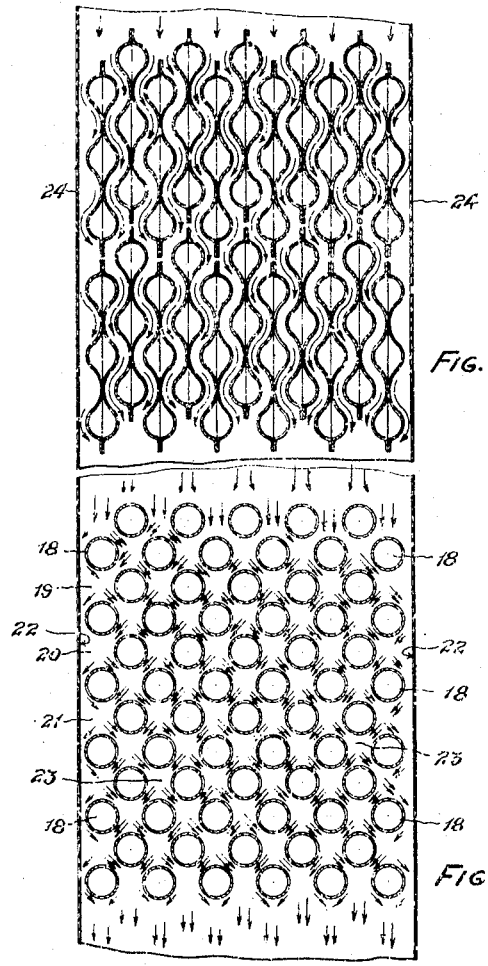

Patented Mar. 24, 1925.

1,530,559

UNITED STATES PATENT OFFICE.

JAMES M. HARRISON, OF CLEVELAND, OHIO.

HEAT-EXCHANGE APPARATUS.

Application filed April 24, 1919. Serial No. 292,315.

*To all whom it may concern:*

Be it known that I, JAMES M. HARRISON, a citizen of the United States, residing at Cleveland, in the county of Cuyahoga and State of Ohio, have invented certain new and useful Improvements in Heat-Exchange Apparatus, of which the following is a specification.

My invention relates to heating or cooling apparatus and has particular reference to the exchange of heat between a fluid confined in a circulating system of ducts or receptacles and a fluid which surrounds or is caused to pass over the exterior surface of such ducts or receptacles. It is particularly applicable to the heating of air for combustion, heating and ventilating, drying or processing purposes, or to the heating or cooling of any kind of fluid which may be heated or cooled by contact with hot or cold metallic surfaces. My invention is of the class of heat exchange apparatus frequently called radiators.

More specifically my invention belongs to that class of apparatus in which one fluid is confined in a system of ducts, the surfaces of which aggregate a large area, through which ducts the heating or cooling fluid is circulated and around which ducts the fluid to be heated or cooled is circulated, or vice versa, as may be best suited to meet the requirements of the conditions under which the apparatus is used.

The object of my invention is to provide a radiator having large surfaces exposed to the fluids between which there is to be an exchange of heat, these surface being so disposed and shaped that they are parallel to the direction of flow of fluid over them and so offer only frictional resistance without obstructional resistance. At the same time they expose a large area to the fluids which continuously contact with the heat-exchange surfaces during their passage over them. To attain the objects of my invention, I provide a new and improved form of heat-exchange element or radiator section which may be readily and cheaply manufactured and which may be assembled in a manner which will assist the efficient exchange of heat between the interior and exterior fluids.

Figure 1:
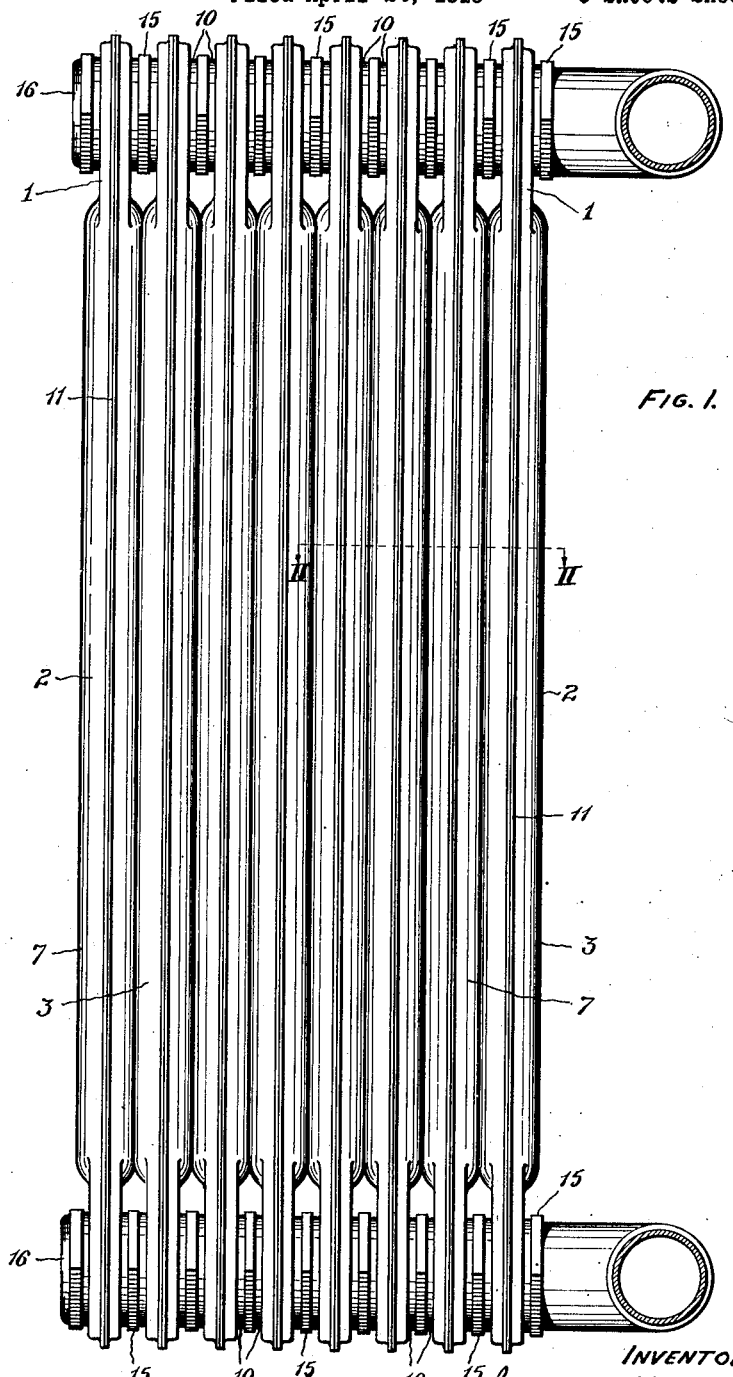
Figure 2:
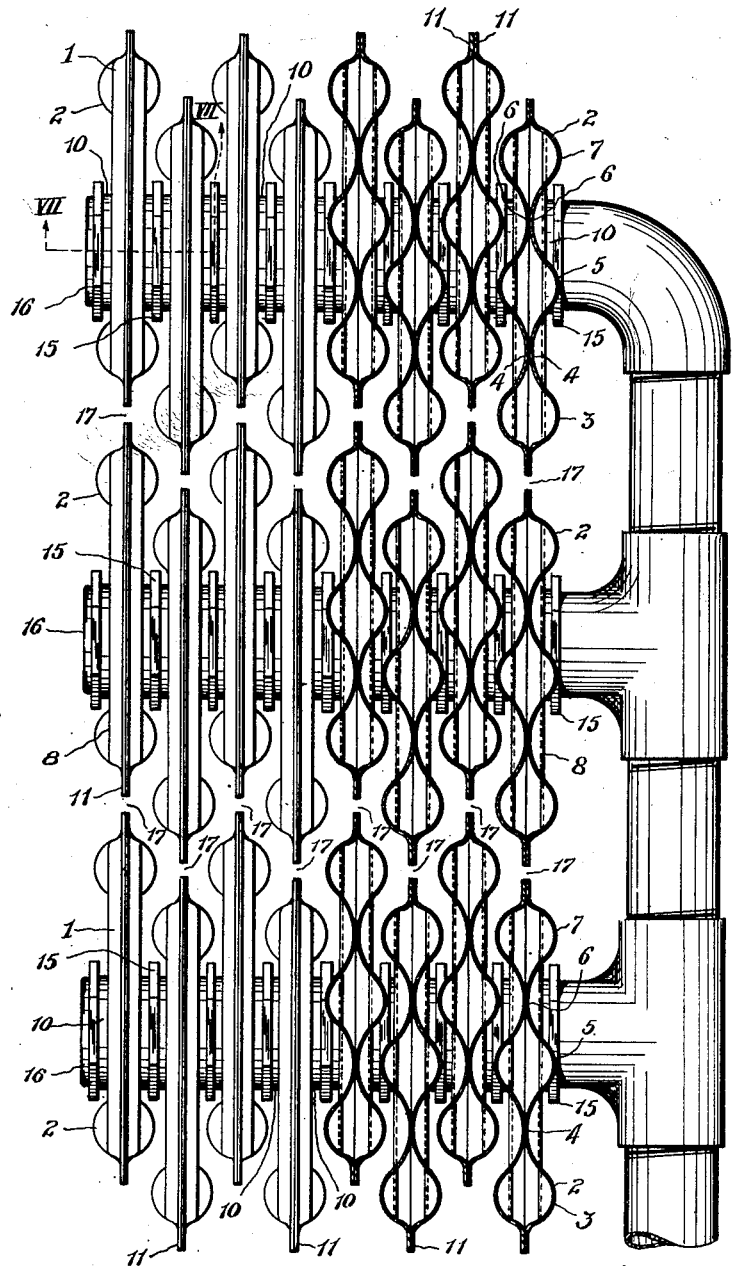

Referring to the drawings, Fig. 1 is an end elevation of a group of rows of my radiator sections assembled for use; Fig. 2 is a plan view partly in horizontal section on line II—II of Fig. 1; Fig. 3 is a side elevation of a half section of my heat-exchange element or radiator section looking from the inside outward; Fig. 4 is a horizontal section on line IV—IV of Fig. 3; Fig. 5 is a horizontal section on line V—V of Fig. 3; Fig. 6 is a fragmentary vertical section on line VI—VI of Fig. 3; Fig. 7 is a fragmentary section through the connecting nipples, this section being taken on line VII—VII of Fig. 2; Fig. 8 is a plan view of an installation of a group of my radiators within a heating or cooling duct; Fig. 9 is a vertical section on line IX—IX of Fig. 8; Fig. 10 is a diagrammatic drawing showing the paths of the exterior fluids or gases through a group of my radiator sections; Fig. 11 is a diagrammatic drawing showing the paths of the exterior fluid or gases between the tubes of a well known form of heat-exchange apparatus made up of parallel rows of spaced apart round pipes; and Fig. 12 is a horizontal section through a group of rows of my heat-exchange elements in which the elements have four columns, each, instead of three as do those which are shown in the other figures of the drawings.

I prefer to construct my radiator sections in the manner shown in Figs. 3, 4, 5, 6 and 7 which show the detail of a pressed sheet metal section. I do not limit my invention to the particular kind of metal of which the section is made nor to the precise form and proportions of either the completed section or of its component parts. There are, however, certain essential principles of construction and features of form which I shall further point out in these specifications.

The heat-exchange element or radiator section shown in detail in Figs. 3, 4, 5, 6 and 7 consists of two half sections joined to form a complete section. Referring to these figures, 1, is a half-section which as shown is made of pressed sheet metal as above mentioned. The middle portion, 2, of this section is corrugated to form vertical half-round columns or ribs, 3, 4, 5, 6 and 7 projecting alternately outwardly and inwardly, of which the outwardly projecting half-columns or ribs, 3, 5 and 7 have a smaller radius of curvature, R, than the radius of curvature R′, of the inwardly projecting half-columns or ribs, 4 and 6. As will be seen from an inspection of the drawings the difference between the lengths of the radii, R′, and R, is the width of the curved alley between the sections when they are assembled in a row. It will be understood that I do not limit my construction to the precise number of corrugations or columns that I have shown in the drawings. In Fig. 12 there are shown sections each having four outwardly projecting columns.

Portions, 8, of the convector-section above and below the corrugated part, 2 are left plain, and of less width than the fluid columns. Openings, 9, 9, are formed in these plain portions, equidistant from the vertical center of the half-section and these openings are provided with cylindrical flanges, 10, 10. A plain, flat flange, 11, is formed around the entire periphery of the half section, 1.

The complete section is made by joining two half-sections so that the openings, 9, in each of the halves are in alignment with each other. The joining of the half-sections may be accomplished in any suitable way as by welding, brazing, lock-seaming or otherwise. It will be seen that the abutting surfaces of the flanges, 11, are in a plane tangent to the inwardly projecting half columns, 4 and 6, so that when a section is formed by joining two half sections the inwardly projecting half columns, 4 and 6, of the half-sections contact along vertical lines at their centers. This can be clearly seen in the sectioned portion of Fig. 2. These inwardly projecting half-columns may be joined where they contact, if desired, by welding or riveting but this is not essential except for withstanding high internal pressure.

Into each pair of aligned holes, 9, of the section there is inserted a perforated sleeve or thimble, 12. This sleeve is made to form a fluid tight joint with the flanges, 10, of both halves of the section by welding, brazing or other means. Perforations, 13, are provided in sleeve, 12, to permit the passage of fluid through the sleeve into or out of the section, and the sleeve is threaded internally, at 14, to receive the externally threaded connecting nipples, 15. These nipples, 15, join the sections in a row and afford means for connecting the fluid supply and return ducts to the ends of the row, where such connection is to be made. Where no connection is to be made at the end of a row, a plug, or other closure, 16, may be screwed directly into the sleeve, 12. Instead of threaded nipples, the well-known push nipples may be used for connecting the sections in a row, if desired.

The opening, 9, is located half way between the centers of adjacent half-columns as is shown in Fig. 4, where the total distance between the centers of adjacent half-columns is dimensioned 2A, and the distance between the center of the opening, 9, and the center of the half-column on either side of it is dimensioned, A.

The opening, 9, is located to one side of the longitudinal center of the half-section. The longitudinal center of the half-section shown in Fig. 4, coincides with the center of the outwardly projecting half-column, 5, and it will be seen that the center of opening, 9, is removed from this longitudinal center of the half-section the distance, A. When the section comprises more than three outwardly projecting half-columns the distance between the center of the opening, 9, and the center of the section may be more than the distance, A, which is half the distance between the centers of adjacent half-columns but is preferably A. If this distance be greater than A it should be a multiple of it.

In Fig. 12, which is a diagrammatic horizontal section through a group of rows of sections in which the sections are composed of four outwardly projecting columns instead of three as shown in the other figures of the drawings the distance from the center of the section to the center of the connecting opening is the distance A.

It will be observed that the vertical transverse plane passing through the centers of the holes, 9, divides the section longitudinally into two unequal parts. When the sections are assembled in a row alternate sections are reversed so that the long ends of adjacent sections are on opposite sides of the openings, 9, and the connecting nipples, 15.

It will also be observed that the outwardly projecting half-columns of one section are concentric with the inwardly projecting half-columns of the next adjacent section. In other words the exterior surfaces of the sections are provided with corrugations and the sections are assembled in rows in such a manner that the convex portions of the surface of one section stand opposite to or in line with the concave portions of the surface of the next adjacent section. Adjacent rows of sections are preferably assembled so that the distance between the centers of the end columns of the adjacent rows will be the same as the distance between the centers of adjacent columns in the same section. In other words the sections are assembled together in rows and the rows of sections are assembled in groups in such a manner that the fluid alleys are uniform in horizontal cross section throughout each row and throughout the group of rows.

The alleys or paths through which the air or other fluid passes as it travels from one end to the other of the group will be seen to be curved first in one direction and then the other, each path having virtually continuous walls on either side, parallel to the direction of flow of fluid through the alley. The fluid contacts continuously with these walls as it passes along. There are no projections forming abrupt obstructions to cause eddies or voids in the streams of fluid. As the direction of the paths changes continuously, the streams of fluid are directed first against one side and then against the other of the alleys, and as there are no openings between the adjacent columns of a section the fluid is confined in the same path throughout its passage through each row of sections.

Of the fluid flowing through any alley, that which contacts with the surface of the heat-exchange elements meets with greater frictional resistance than that which is in the center of the alley and is retarded. Further, the direction of movement of the fluid through the alley is continuously deflected by the curved surfaces of the heat-exchange elements. The fluid is therefore subjected to forced convection of and exchange of heat between its molecules and exchange of heat between its molecules and the surfaces of the heat exchange elements continuously during the passage of fluid through the alley. This forced convection is accomplished in my invention without the use of obstructions such as are employed in other forms of heat-exchange elements with which I am familiar. The use of my invention therefore results in a reduction of the power required to force the fluid through the alleys for a given degree of heat-exchange. On account of the absence of voids or open spaces in or between the alleys in which the exchange of heat is retarded, the use of my invention results in a saving in the size or number of heat-exchange elements required for a given degree of heat-exchange.

As will be seen in the structure shown in Fig. 2, there are small openings, 17, between the ends of the sections of adjacent rows, but as the frictional resistance to the passage of fluid is the same in all of the paths through the rows of sections there is no tendency for more of the fluid to pass through one path than through another and these openings, 17, are, therefore, not objectionable.

Besides affording an increased effective heating surface for the passing fluids, the construction of my radiator prevents the tendency present in other forms of heat-exchange apparatus for the passing fluid to follow certain of the alleys between the heat-exchange elements and to avoid others of the alleys due to differences in the cross section of the alleys and to differences in the frictional resistance to the fluids offered by the different alleys. This tendency is illustrated in Fig. 11, which is a section through a bank of heating elements consisting of tubes or projections, 18, spaced apart both longitudinally and transversely of the stream of passing fluid. The direction of the fluid through the paths is shown by the arrows in the fluid alleys. It will be seen that portions of these alleys as for instance those marked, 19, 20, and 21, are "blind alleys", that is to say fluid passing through these alleys from the top of the figure diagonally downward to the left eventually strikes the wall, 22, and is deflected into one of the diagonal alleys slanting downwardly to the right. This creates congestion and friction which retards the flow through the alleys nearer the walls, 22, and forces the fluid to pass in greater volume through the central portion of the heating tunnel.

By comparing this Fig. 11 with Fig. 10, which latter represents diagrammatically a similar section through a group of my radiators sections, it will be seen that the use of my invention overcomes the congestion of fluid near the side walls, 24, of the heating tunnel and that the fluid meets with equal resistance to its passage in all of the alleys. The entire available heating surface of my radiator is consequently used to the best advantage and without direct obstruction being presented to the passing fluids. In my radiator there is no chance for the formation of voids or eddies such as are formed in the spaces, 23, between the tubes or projections, 18, of the form of radiator shown in Fig. 11, and in other types which are composed of alternate columns or other obstructions and open spaces.

It will be seen that the heat-exchange surfaces are larger than in the type shown in Fig. 11, extend continuously through the group on both sides of the fluid alleys and that the fluid is consequently continuously in contact with these heat-exchange surfaces during its passage through the alleys.

In Figs. 8 and 9, four rows of heat-exchange elements, 25, 26, 27 and 28 are shown connected to the fluid inlet and outlet pipes, 29 and 30, by suitable connecting means, 31 and 32. The group of four rows of heat-exchange elements is shown installed in a duct or tunnel, 33, which is shown connected to the discharge end of a rotary fan, 34, which is driven by a motor, 35. The outlet end of duct, 33, opens into another duct or plenum chamber, 36. One of the two fluids between which there is to occur an exchange of heat is made to flow through the interior of the heat-exchange elements from pipe, 29, to pipe, 30, or vice versa, and the other fluid is made to flow through the heat alleys, 37, over the exterior surfaces of the heat-exchange elements, thereby effecting the desired heat-exchange between the fluids. It will be understood that the fan, 34, or other means employed to cause the fluid to pass through the duct, 33, may be connected either as shown to "blow through" or may be connected to "pull through" in the well known manner.

While I have shown and described a pressed sheet metal section as my preferred form of heat-exchange element, it will be apparent to those skilled in the art that the section may be cast either in halves and joined together in the same manner as I have shown my sheet metal sections to be joined or each section may be cast complete in one casting. It will also be apparent that modification in the manner of connecting the sections in a row and in the manner of assembling and connecting the rows in groups may be made without departing from the scope of my invention.

Having thus described my invention, I claim and desire to secure by Letters Patent:

1. A heat-exchange element having its outer surface corrugated and having an opening in its side wall adapted to be connected to a supply pipe, the center of said opening being located to one side of the longitudinal center of said heat-exchange element a distance equal to one half of the distance between the centers of adjacent concave and convex portions of said corrugated surface.

2. A heat-exchange element having its outer surface corrugated the corrugations of opposite side walls being parallel and having an opening in its side wall adapted to be connected to a supply pipe, the center of said opening being located midway between the centers of adjacent concave and convex portions of said corrugated surface.

3. A heat-exchange element formed of two like half-sections, each having a portion of its walls corrugated, and each having two openings in its wall the centers of which are located midway between the centers of adjacent concave and convex portions of said corrugated wall, the two openings being equidistant from the vertical center of the half-section.

4. In apparatus of the class described a plurality of similar heat-exchange elements connected together in a row, the outer surfaces of said elements being corrugated, each element being provided with a connection opening the center of which is located midway between a convex and a concave portion of said corrugated surface, and adjacent elements being staggered by being reversed in position about said connection opening so that the convex portions of the surface of one element stand opposite the concave portions of the surface of the next element in the row.

5. In apparatus of the class described, a plurality of heat-exchange elements assembled in spaced-apart relation in a row, each of said heat-exchange elements having its outer surface corrugated the corrugations of opposite side walls being parallel and having an opening in its side wall adapted to be connected to fluid conducting means, the center of said opening being located midway between the centers of adjacent concave and convex portions of said corrugated surface, and fluid conducting means connecting the opening in one element to the opening in the next adjacent element.

6. In apparatus of the class described, a plurality of heat-exchange elements assembled in spaced-apart relation in a row, each of said heat-exchange elements having its outer surface corrugated and having an opening in its side wall adapted to be connected to fluid conducting means, the center of said opening being located midway between the centers of adjacent concave and convex portions of said corrugated surface, alternate elements in said row being reversed in position about said opening so that the convex portions of the surface of one element stand opposite the concave portions of the next adjacent element, and fluid conducting means connecting the openings in adjacent elements.

7. A heat-exchange element formed of two like half-sections each having a portion of its walls corrugated and each having two openings in its wall the centers of which are located to one side of the longitudinal center of said half-section a distance equal to one half the distance between the centers of adjacent concave and convex portions of said corrugated surface, said openings being equi-distant from the vertical center of said half-section, said two half-sections being joined together with their openings in axial alignment.

8. A heat-exchange element composed of two similar half-sections joined together at their edges, said half-sections being corrugated and assembled so that the convex portions of one half-section are opposite the convex portions of the other half-section, each half-section having an opening whose center is midway between the centers of its adjacent concave and convex portions.

9. A heat-exchange element having an upper and a lower chamber connected by a plurality of hollow columns, the walls of one of said chambers having an opening the center of which is located at a distance from the center of one of said columns equal to one fourth the distance between the centers of adjacent columns.

10. A heat-exchange element composed of a corrugated portion and plain upper and lower portions, the corrugations of opposite side walls being parallel and having an opening in one of said plain portions the center of which is located midway between a concave and a convex rib of said corrugated portion.

11. A heat-exchange element having its sides corrugated the corrugations of opposite sides being parallel and having an opening the center of which is located midway between a concave and a convex rib of its corrugations.

12. In apparatus of the class described a plurality of similar heat exchange elements assembled spaced apart side by side in a row, the center of each element having its sides corrugated and the elements being assembled so that the convex portions of each element are opposite the concave portions of the adjacent element and means connecting the elements, the center of said means being disposed midway between said concave and convex portions.

13. A heat-exchange element composed of two similar corrugated half sections provided with a fluid inlet opening and a fluid outlet opening each of said openings being located midway between the centers of adjacent concave and convex portions of said corrugated surface and said openings being equidistant from the vertical center of said element.

In testimony whereof I affix my signature in the presence of two witnesses.

JAMES M. HARRISON.

Witnesses:
ALFRED C. NELSON,
MILDRED H. PRENTKE.